United States Patent [19]
Chen et al.

[11] Patent Number: 6,040,866
[45] Date of Patent: Mar. 21, 2000

[54] TRANSMISSION OF VARIABLE-BIT-RATE INFORMATION DATA ON CONSTANT-BIT-RATE CHANNEL

[76] Inventors: Meng-Chang Chen; Jan-Ming Ho; Ming-Tat Ko; Ray-I Chang, all of Institute of Information Science Academia Sinica, Nankang, Taipei, Taiwan

[21] Appl. No.: 08/912,849

[22] Filed: Aug. 19, 1997

[51] Int. Cl.[7] .............................. H04N 7/12; H04N 11/02; H04N 11/04
[52] U.S. Cl. ............................................. 348/419; 348/405
[58] Field of Search ...................................... 348/405, 419, 348/423, 464–467, 845.1, 845.2, 845.3; 375/219–220, 242, 245; 370/234, 253; H04N 7/12, 11/02, 11/04

[56] References Cited

U.S. PATENT DOCUMENTS

| | | | |
|---|---|---|---|
| 5,274,633 | 12/1993 | Kato et al. ................................. | 370/60 |
| 5,805,577 | 9/1998 | Jain et al. ................................. | 370/234 |
| 5,877,812 | 3/1999 | Krause et al. ........................... | 348/423 |
| 5,892,915 | 4/1999 | Duso et al. .................................. | 348/7 |

*Primary Examiner*—Howard Britton
*Assistant Examiner*—Nhon T. Diep
*Attorney, Agent, or Firm*—Bacon & Thomas

[57] ABSTRACT

A method for transmitting information data with a variable bit-rate (VBR) on a transmission channel with constant bit-rate (CBR) uses both a "lazy" algorithm and an "aggressive" algorithm. The "lazy algorithm" determines a transmission schedule where the smallest client buffer requirement and shortest working-ahead under a decided transmission rate may be obtained. The "aggressive algorithm" determines a transmission schedule whereby the highest utility rate of the network under a specific client buffer size may be obtained.

3 Claims, 7 Drawing Sheets

TRANSMISSION OF VARIABLE-BIT-RATE INFORMATION DATA ON CONSTANT-BIT-RATE CHANNEL

FIELD OF INVENTION

The present invention relates to a method for transmitting information data with variable bit-rate (VBR) on channels with a constant bit-rate (CBR), a especially to a method for transmitting variable-bit-rated information data on a constant-bit-rated channel using a "lazy" algorithm and an "aggressive" algorithm.

BACKGROUND OF THE INVENTION

The transmission of multimedia data, as in the applications of video conferencing, digital library, home shopping and distance learning, has been an important task for researchers either in the industrial or in the academic field. Both audio and video data are transmitted over high-speed networks in these applications and played back continuously at remote client equipments. As resources are usually allocated exclusively to a fixed-size to each service stream, it is relatively simple for networks to support CBR services in terms of management complexity and overhead. However, due to compression technologies, digital media streams (e.g., audio and video data streams) are usually tranmitted with VBR. It would be a waste of the network bandwidth if the peak rate is allocated in transmitting VBR streams because the average rate of the VBR streams, e.g., an MPEG video, is less than 25% of its peak rate.

On the other hand, in the VBR service model, data streams are multiplexed to share the entire linkage bandwidth. The admission control and the network transmission scheduling at the intermediate network nodes, e.g., output ports of ATM switches, are usually quite complicated both in the analysis and in the implementation.

Figure 1:
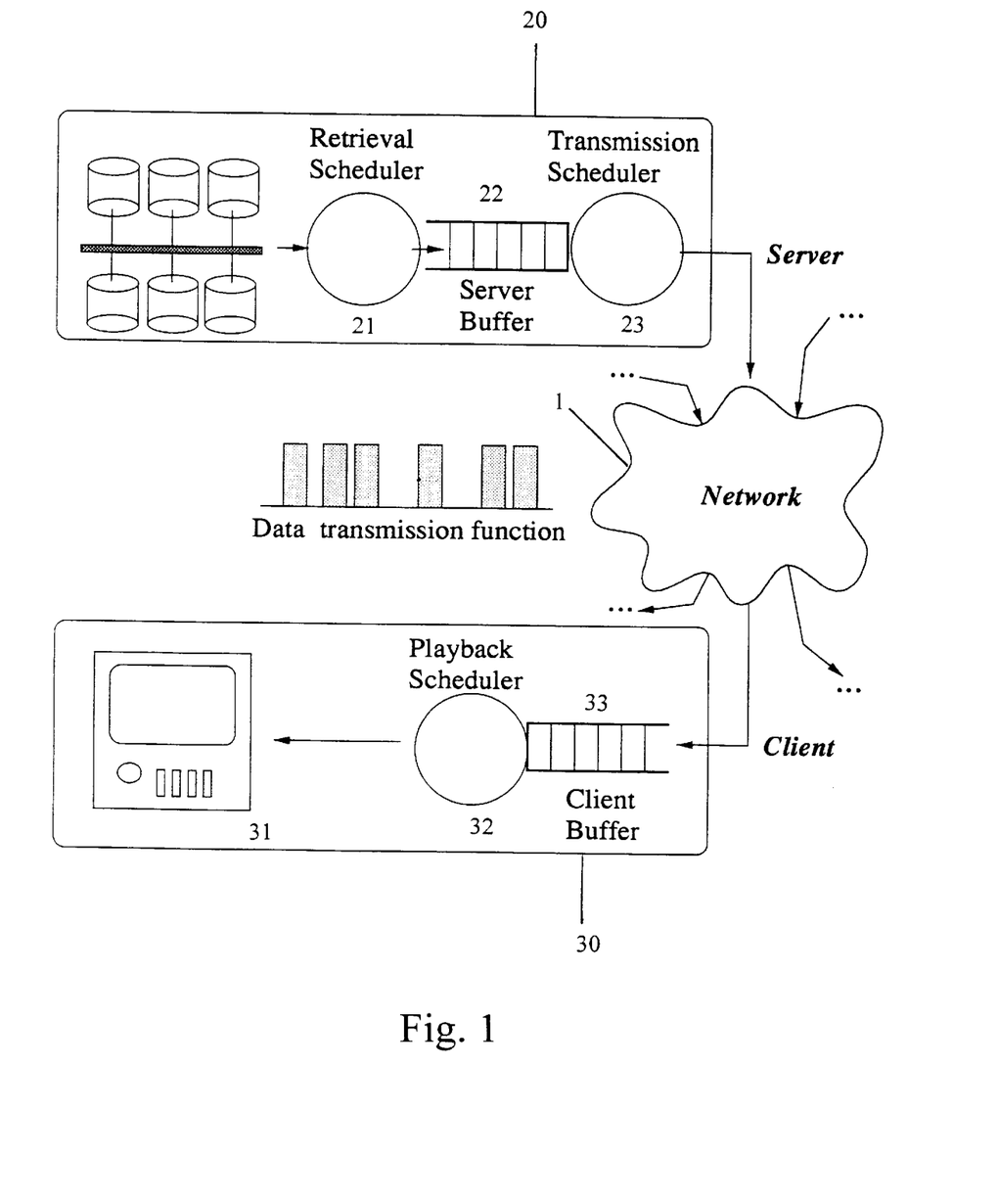
FIG. 1 illustrates the system schematics of a network data transmission system.

FIG. 1 illustrates the system schematics of a data transmission system which transmits information data through a network. As shown in the figure, a data transmission system includes a network main frame 1, at least one server site 20 and at least one client site 30. At the server site 20, at least one retrieval scheduler 21, a server buffer 22 and a transmission scheduler 23 are equipped. On the other hand, at the client site 30, a multimedia display 31, a playback scheduler 32 and a client buffer 33 are equipped. This figure illustrates the structure of a data transmission system facilitating the description of the present invention and will be taken for reference in the following description.

In the conventional art, a deterministic bounding interval dependent traffic model (D-BIND traffic model) has been disclosed. (See Zhang and Knightly: "A new approach to support delay-sensitive VBR video in packet-switched networks", Proc. 5th Workshop on Network and Operating Systems Support for Digital Audio and Video, 1995.) This approach models VBR traffic based on the interdependence among a plurality of bounded regions. However, the required buffer size is large.

Another deterministic guaranteed service called constant-rate transmission and transport (CRTT) was disclosed by McManus and Ross. (McManus and Ross: "Video on demand over ATM: Constant-rate transmission and transport", Proc. IEEE INFOCOM, March 1996.) In this approach, a CRTT server transmits information data to a client at a constant rate. The client starts to playback the first frame of the information data after having received a certain amount of data (also called "build up"). By choosing an appropriate transmission rate, which is a constant rate, and the build up size, the client buffer size can be minimized. The drawback of this approach, however, is that the size of the client buffer will be relatively large. It requires approximately 22.3 MB memory to playback the data of the famous movie: "Star Wars".

It is thus a need in the industry to provide a novel method for the transmission of VBR information data over CBR channels whereby the buffer size and the working-ahead as required may be minimized. It is also necessary to provide a method for the transmission of VBR information data over CBR channels whereby the network utilization may be maximized.

OBJECTIVES OF THE INVENTION

The purpose of this invention is to provide a novel method for the transmission of VBR information data over CBR channels whereby the buffer size as required at the client site and the working-ahead may both be minimized.

Another purpose of this invention is to provide a novel method for the transmission of VBR information data over CBR channels whereby the network utilization may be maximized.

Another purpose of this invention is to provide a novel method for the transmission of VBR information data over CBR channels, using a lazy algorithm and an aggressive algorithm to determine the transmission schedule.

SUMMARY OF THE INVENTION

According to this invention, the transmission of VBR information data through CBR network services is determined by a "lazy" algorithm and an "aggressive" algorithm. During the transmission of the information, two alternative transmission states, i.e., the ON state and the OFF state, are used.

Given an information stream $v$, $v=\{f_1, f_2, \ldots, f_n; T_f\}$ where $f_i$ is the $i^{th}$ frame of the information stream and $T_f$ is the time interval between two information frames, a transmission schedule $\gamma$ where $\gamma=\{r; t_0, t_1, t_2, \ldots, t_m\}$ is determined whereby the server starts to send data under transmission rate r at time $t_0$, pauses at $t_1$, resumes sending data at $t_2$ under the same transmission rate, pauses again at $t_3$, and so on. The playback is conducted at the client site at a constant rate $1/T_f$ (frame per second). The transmission schedule for a video stream is determined such that the utilization of the network, $u=T_{on}/T_c$, is maximum and that the required client buffer size is minimum, where $T_{on}$ and $T_c$ denote the cumulative transmission time and the total connection time respectively.

According to this invention, given a video stream and a constant transmission rate r, the "lazy algorithm" reconstructs the data stream such that the data are not transmitted until the data are required to be played back. The "aggressive algorithm" determines a transmission schedule such that the data stream is continuously transmitted as long as the client's buffer is available to receive the data. The lazy algorithm minimizes the required buffer size at the client site and the aggressive algorithm condenses the transmission time of the information data. Under the lazy-aggressive algorithm, the data may be transmitted under almost the peak rate of the network at the ON status, so that the utilization rate may be enhanced. The invented approach is especially suited for MPEG encoded, stored video traffic.

These and other purposes and advantages of this invention can be clearly understood from the detailed specification to the invention by referring to the following drawings.

DETAILED DESCRIPTION OF THE INVENTION

The following is a detailed description of the embodiements of the present invention. Given an information data stream v and a constant transmission rate r, a transmission schedule γ may be determined such that the required client buffer size ($b_v,_r$) and the work-ahead ($w_v,_r$) are both minimum. Here, we denote the possible minimum buffer size required at the client site to be $\hat{b}_v(r)$ and the possible minimum working-ahead required to be $\hat{w}_v(r)$. In one aspect of this invention, a transmission schedule is determined such that the utilization of the network, $u_v,_r$, under a limited buffer size (b) at the client site, is maximized, denoting the possible maximum net work utilization to be $\hat{u}_v(r)$. In another aspect of this invention, a transmission schedule is determined such that the required buffer size of the client site shall be minimum and network utilization shall be maximum.

The Lazy Algorithm

Given an information stream v with the cumulative frame sizes $F_k$, wherein $v=\{f_1, f_2, \ldots, f_n; T_f\}$ and $0 \leq k \leq n$, a lazy transmission sequence $L_k$ to transmit the information stream, wherein $L_k$ is a cumulative function and $k \geq 0$, can be found such that the client buffer size and the working-ahead of the transmission are both minimum, as follows:

$L_i = |v|$ ∀$i \geq n-1$ and $L_k = \max\{F_k, L_{k+1} - r \times T_f\}$ ∀$0 \leq k < n-1$.

When $L_{k+1} - L_k < r \times T_f$, we have $L_k = F_k$.

Under the lazy transmission sequence, the information stream is reorganized such that, for each transmission section, the cumulative size of the information data is almost equal to the requirement of playback at client site. In other words, the server does not transmit information data unless the client requires such information data to playback. We thus call the transmission sequence a "lazy" algorithm.

In deciding the transmission schedule, given the aforesaid conditiions, the lazy transmission schedule $γ_L$, $γ_L = \{r; t_0, t_1, t_2, \ldots, t_{2p+1}\}$ wherein t represents time points, $t_0, t_2, t_4, \ldots t_{2p}$ represent starting points of transmission and $t_1, t_3, t_5, \ldots t_{2p+1}$ represent end points of transmission, is conducted as follows:

Input: a constant transmission rate r and a video stream v;
Output: a transmission schedule $γ_L$;

(1) At first, all $L_k$'s are decided; $t_0 = -L_0/r$; p=1; and k=0;
(2) If $L_{k+i} - L_k < r \times T_f$, let
$t_p = k \times T_f$ and
$t_{p+1} = (k+1) \times T_f - (L_{k+1} - L_k)/r$ and
p = p+2;
(3) k = k+1;
(4) Repeat (2) and (3) until k=n-1; and
(5) A transmission schedule $γ_L = \{r; t_1, t_1, t_2, \ldots, t_{2p+1}\}$ is obatined.

Figure 2:
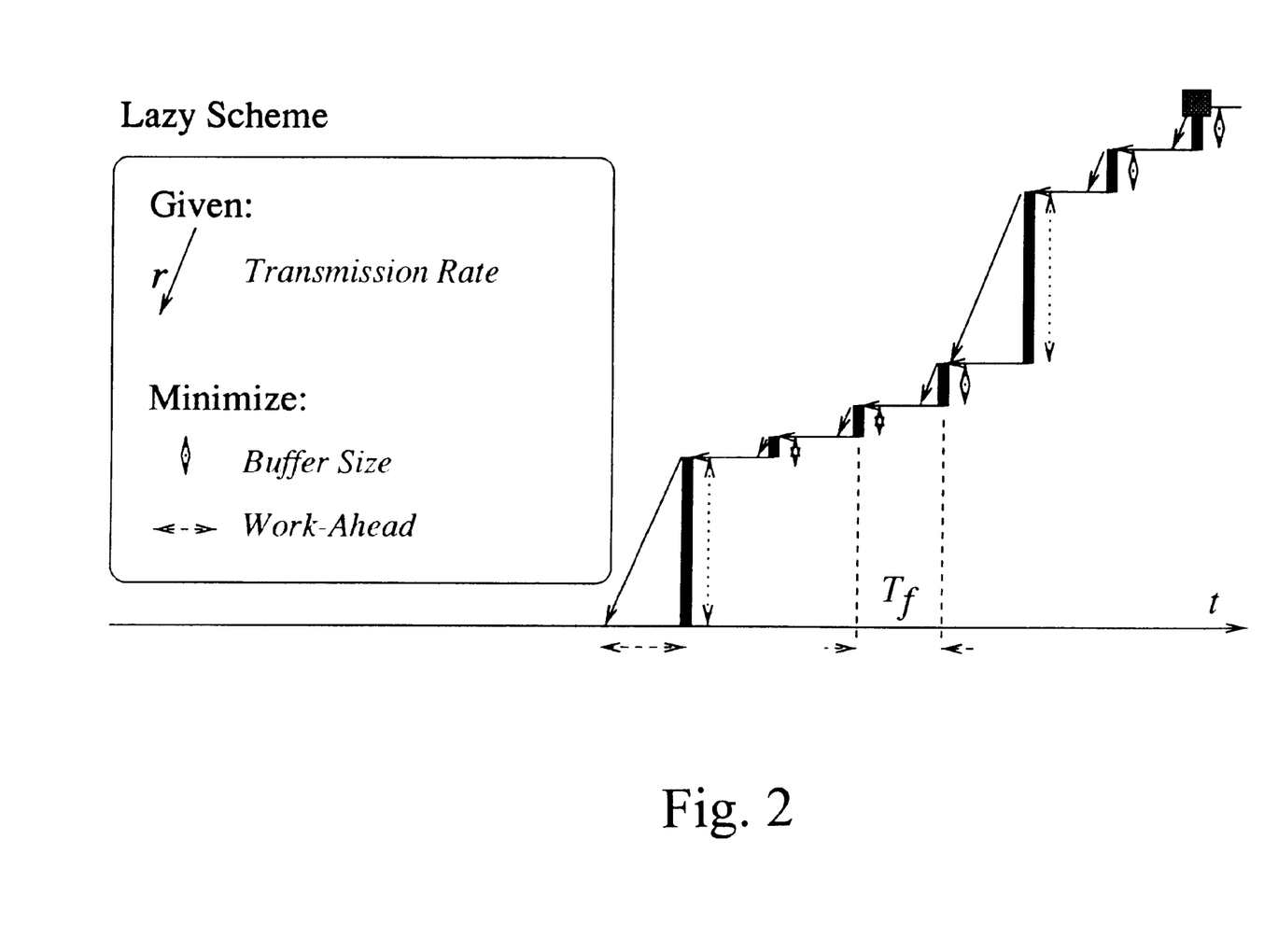
FIG. 2 shows an example of the relation between the transmission schedule and the accumulative data size under the lazy algorithm.

FIG. 2 shows the relation between the transmission schedule and the cumulative data size under the lazy algorithm. As shown in this figure, the transmission schedule $γ_L$ captures the intuition of the transmission data as late as possible. It can therefore be expected that under such transmission schedule the client buffer size will be minimum.

The Aggressive Algorithm

Again, supposing $F_k$, $k \geq 0$, is the cumulative frame size of the video stream, we define an aggressive transmission sequence $A_k$, $k \geq 0$, as follows:

$A_0 = L_0$ ∀$k \leq n-1$ and
$A_k = \min\{|v|, F_k + \hat{b}_v(r), A_{k-1} + r \times T_f\}$ ∀$k \geq 0$ We then have: If $A_k - A_{k-1} < r \times T_f$ and $A_k \approx |v|$, $A_k = F_k + \hat{b}_v(r)$; and $A_k > F_k$.

Under the aggressive transmission sequence, as long as the client buffer is not occupied and the vacancy of the client buffer is available for at least one transmission, as decided by said lazy algorithm, the server commences and/or continues to transmit the information stream to the client. We may call this algorithm an "aggressive algorithm".

In deciding the transmission schedule, an aggressive schedule $γ_A$, $γ_A = \{r; T_0, t_1, t_2, \ldots, t_{2q+1}\}$, wherein t represents time points, $t_0, t_2, t_4, \ldots t_{2q}$ represent starting points of transmission and $t_1, t_3, t_5, \ldots t_{2q+1}$ represent end points of transmission, is conducted as follows:

Input: A constant transmission rate r, a data stream v and a buffer size at the client site b;
Output: a transmission schedule $γ_A$;

(1) First, all $A_k$'s are decided; $t_0 = -A_0/r$; q=1; and k=0;
(2) If $A_{k+1} - A_k < r \times T_f$, let
$t_q = k \times T_f + (A_{k+1} - A_k)/r$;
$t_{q+1} = (k+1) \times T_f$ and
q = q+2;
(3) k = k+1;
(4) Repeat (2) and (3) until k=n-1; and
(5) A transmission schedule $γ_A = \{r; t_0, t_1, t_2, \ldots, t_{2q+1}\}$ is obatined.

Figure 3:
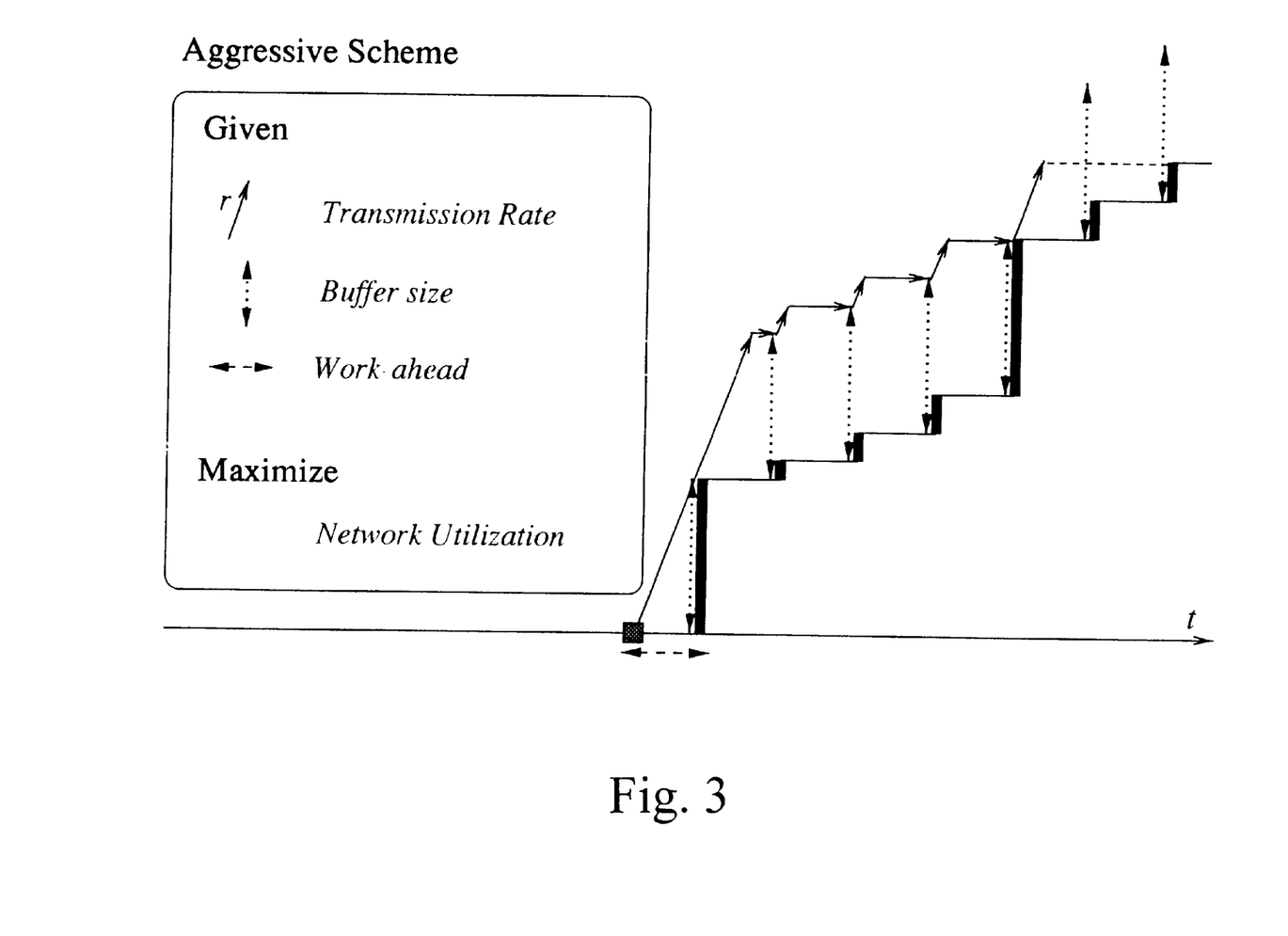
FIG. 3 shows a correspondding example of the relationship between the transmission schedule and the cumulative data size under the aggressive algorithm.

FIG. 3 shows an example of the relation between the transmission schedule and the accumulative data size under the aggressive algorithm. Here, the aggressive transmission schedule is such that the server transmits the information streams to the client as long as the vacancy of the client buffer is available for further transmission. Since under the aggressive algorithm the memory size of the client is always larger than the required buffer size $\hat{b}_v(r)$ under the transmission rate r, jitters may be avoided.

Lazy-Aggressive Transmission Schedule

As the lazy algorithm and the aggressive algorithm are described above, the method for transmitting information data with variable bit-rate on channel with constant bit-rate will be described hereinafter.

The information transmission method of the present invention can be understood as a combination of the lazy algorithm and the aggressive algorithm. According to the present invention, the transmission of the information data is conducted as follows:

At first, the information stream to be transmitted is given and the cumulative size of the information data is calculated.

The lazy algorithm reorganizes the structure of the information stream such that at each stage (section) a bundle of information stream is transmitted to the client site just before the client site starts to play back the information. On the other hand, the aggressive algorithm reconstructs the transmission schedule as determined by the lazy algorithm such that so long as the vacancy of the client buffer is available to receive the information data, the most information data under the decided transmission rate will be transmitted. The transmission schedule is determined by scanning the information stream before transmission. In determining the transmission schedule, the size of the information stream, the transmission rate and the buffer size of the client site are major factors. The calculation is conducted in an 0(n) time.

Figure 4:
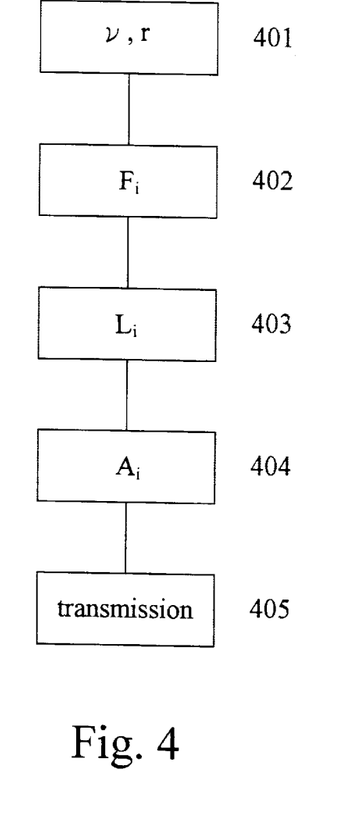
FIG. 4 shows the flow chart of the data transmission method of the present invention.

FIG. 4 illustrates the flow chart of the data transmission method of the present invention. As shown in the figure, at 401 an information stream v, $v=\{f_0, f_1, f_2, \ldots, f_{n-1}\}$ wherein $f_i$ denotes frames of said information stream, $0 \leq i < n$ and $F_{-1}=0$, a peak transmission rate r and the buffer size of the client site b are given. At 402 the cumulative size of the information stream, $F_i$, $F_i = F_{i-1} + f_i$ where $0 \leq i \leq n$ and $F_{-1}=0$ is calculated. At 403 the lazy algorithm $\gamma_L$ is used to determine a transmission sequence $L_i$, $L_i = \max\{F_i, L_{i+1} - r \times T_f\}$ (for $0 \leq i < n-2$), and $L_{n-1} = |v|$ wherein $T_f$ denotes the inteval between two successive frames. Under the lazy algorithm the minimum buffer size required for the transmission $\hat{b}_v(r)$ and the work-ahead $\hat{w}_v(r)$ are determined: $\hat{b}_v(r) = \max_{i=0}^{n-1}\{L_i - F_i\}$ and $\hat{w}_v(r) = L_0/r$, respectively.

At 404 the aggressive algorithm is used to determine a transmission sequence $A_i$, $A_i = \min\{|v|, F_i + \hat{b}_v(r), A_{i-1} + r \times T_f\}$ (for $1 \leq i \leq n-1$) and $A_0 = L_0$.

Under the transmission schudule so determined, the connection time of the network can be minimized. Although it is not desired to limit the scope of this invention, it is found that under the lazy algorithm the network is connected even when the transmission is under OFF situation. The aggressive algorithm can, based on the buffer size at the client site, condense the transmission time so that the network can be utilized at most.

At 405 the server transmits the information data according to the transmission schedule so determined.

As described above, the determination of transmission schedule under the present invention is a one-dimensional calculation and can be conducted in a relatively short time. For a movie with two hours of play-back time and having 174,136 frames, only 3 seconds are used to determine the transmission schudule under a Sun® workstation.

EXPERIMENTS

Experiment I

In order to demonstrate the effects of the present invention, some experiments are conducted. Table I shows the results of the experiments.

Experiment I is conducted to the data file of the famous movie, Star Wars, under the MPEG1 format. The average frame size is 1.9 KB with the maximum frame size 22.62 KB and the minimum frame size 0.28 KB. As the frame size varies within a wide range, it requires 23 MB memory buffer and 37 sec working-ahead under the CRTT transmission schedule (See Experiment VIII in Table 1). By employing the transmission schedule of this invention, the video stream can be transmitted to a 6 MB memory buffer and 26 ms working-ahead. The network utilization under the transmission schedule is nearly 80% under 0.47 Mbps transmission rate.

Experiments II–V, VIII and IX

Several experiments are conducted on the following video programs: Princess Bride, CNN News, Wizard of Oz and some advertisements. The results are shown in Experiments II–V in Table 1. Experiments VIII and IX are comparative experiments for two of the above-said video programs under CRTT and D-BIND transmission schudules. As shown in the experiments, this invention requires smaller buffer size and working ahead but enhances the network utilization.

Experiments VI and VII

Figure 5:
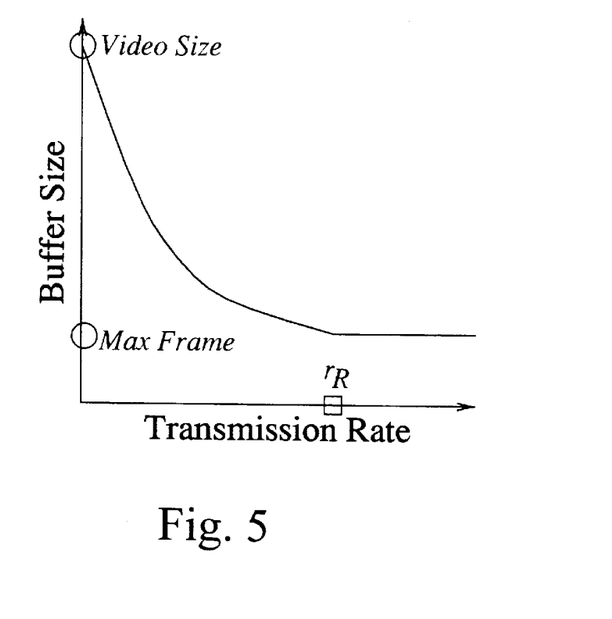
FIGS. 5 illustrates the functional relation between the transmission rate and the required client buffer size under the transmission schedule of this invention.

It is found that the required client buffer size increases in relation to the network utilization rate. FIG. 5 illustrates the relation between the required buffer size and the network utilization rate for transmitting the video file, Star Wars. Experiment VI shows that with an additional 5 MB buffer memory, the network utilization increases from 80% (Experiment I) to 90%. Similarly, in Experiment VII, while the buffer size is reduced to 316 MB and the working-ahead to 100 ms, the utilization is reduced to about 70%.

Figure 6:
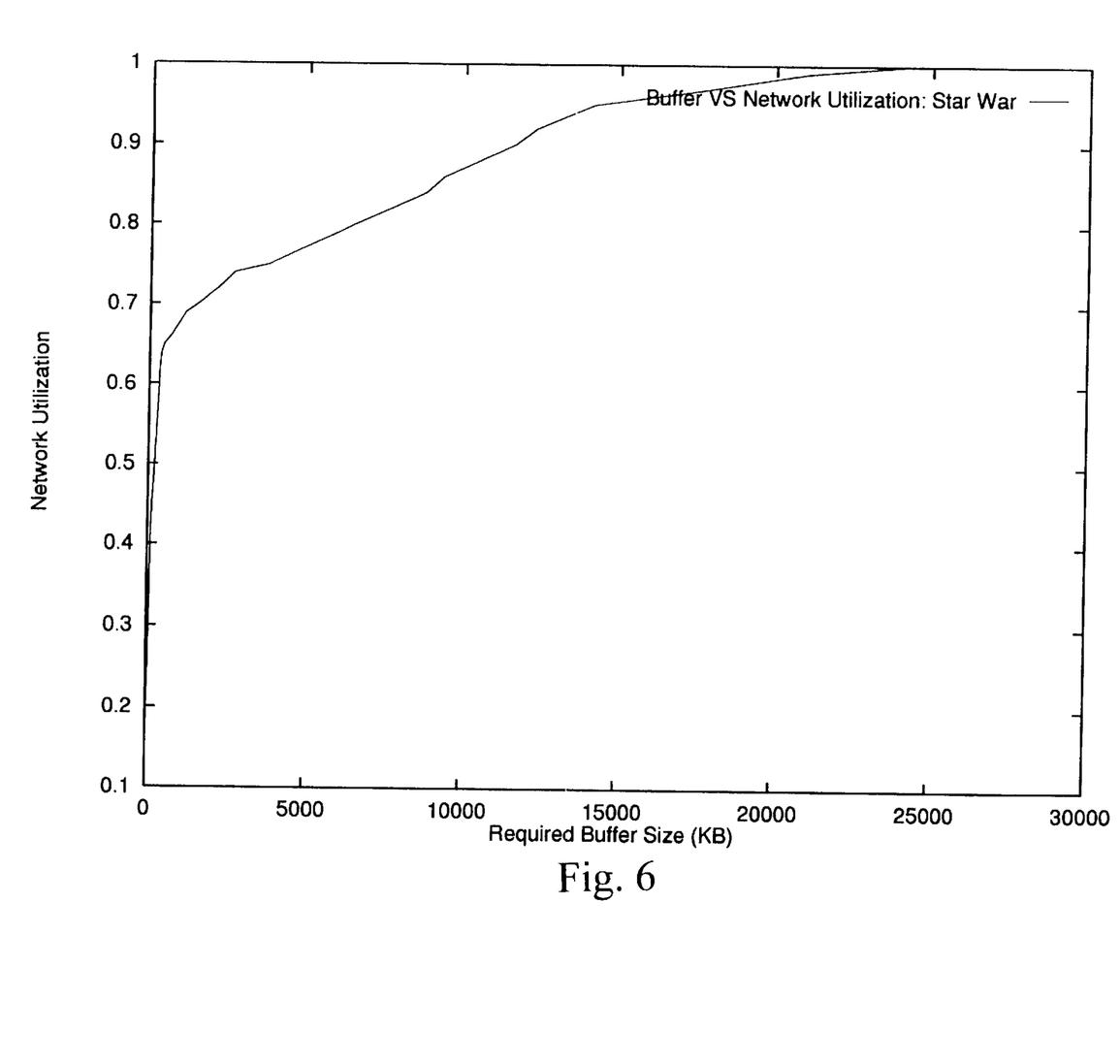
FIG. 6 illustrates the functional relation between the client buffer memory and the network utilization rate under the transmission schedule of this invention.
Figure 7:
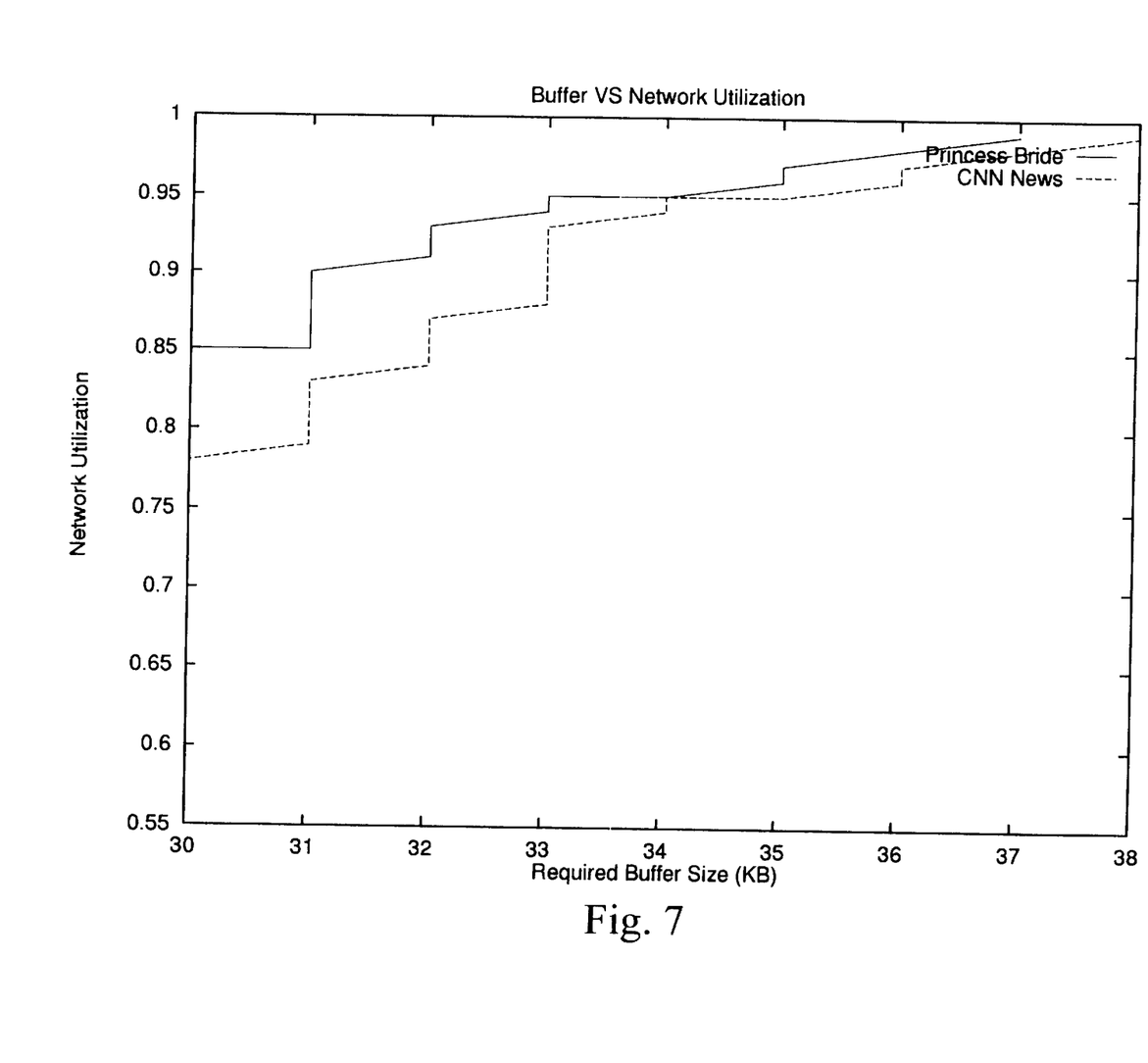
FIGS. 7 and 8 respectively illustrate the relation between the required client memory and the utilization rate of the network, when certain video files are transmitted under the transmission schedule of this invention.
Figure 8:
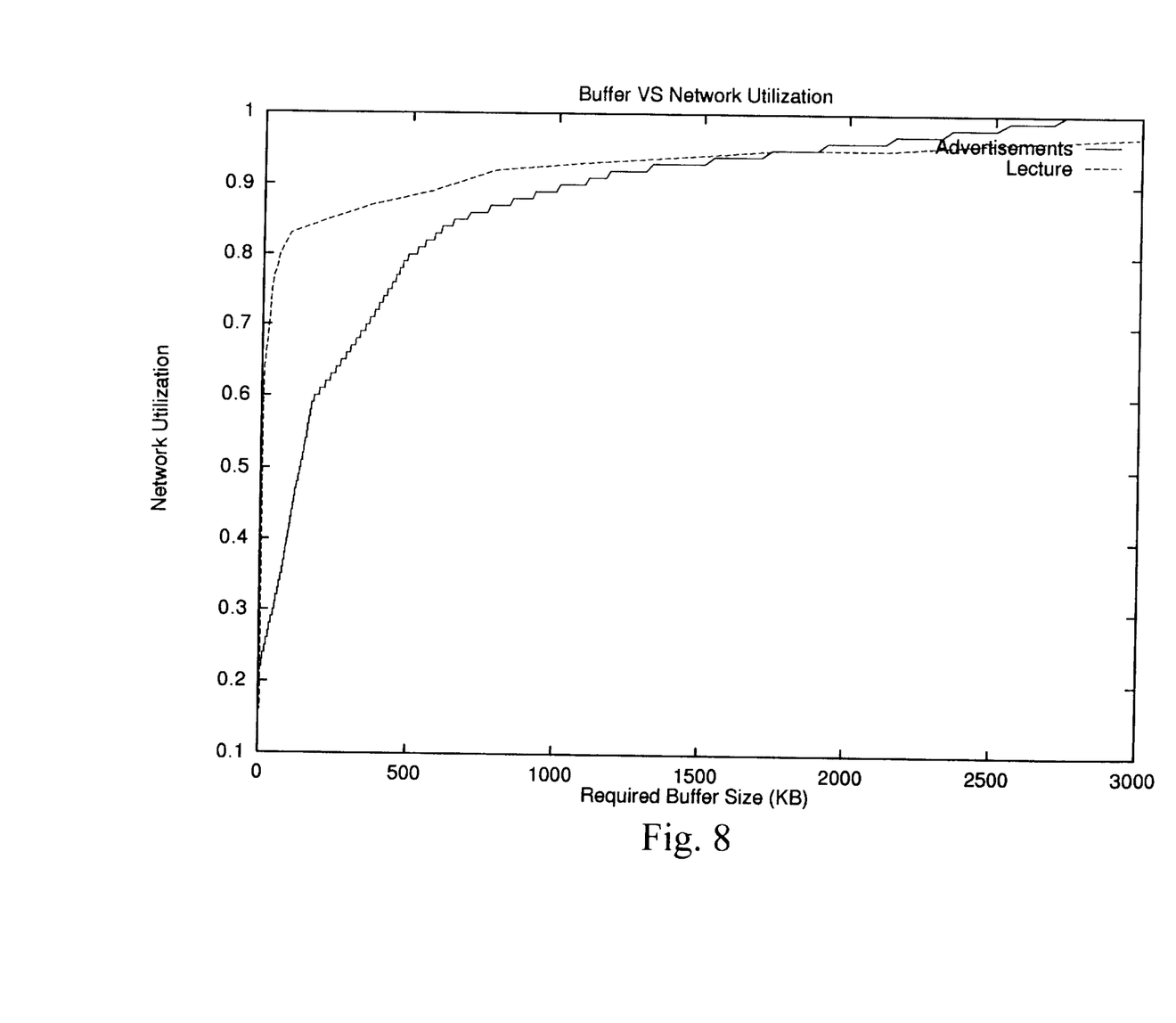

The relation between the required buffer size and the network utilization for other video programs are shown in FIGS. 6 and 7. While the relation between the required buffer size and the utilization of the network are understood, the transmission schedule can be determined with higher flexibility.

While the available buffer size of the client site and the peak transmission rate of the network are known, the transmission schedule can be determined depending on the client's preference. That is, whether the transmission schedule is memory-conscious or utilization-conscious. If the transmission schedule is memory-conscious, the server determines the transmission schedule based on a minimum memory requirement while the network utilization is still under the client constrains. If the transmission schedule is utilization-conscious, the server determines the transmission scheudle based on a maximal network utilization under the limit of the available client buffer size. If, however, the buffer size of the client site is not sufficient for transmission under the peak transmission rate of the network, the server rejects the request.

As the present invention has been shown and described with reference to preferred embodiments thereof, those skilled in the art will recognize that the above and other changes may be made therein without departing from the spirit and scope of the invention.

TABLE 1

| Expermt. No. | Title of Program | No. of Frames | Max. Frame Size | Avg. Frame Size | Transm. rate r | Memo. Size | Working-ahead | Network Utilization |
|---|---|---|---|---|---|---|---|---|
| 1 | Star War | 174136 | 22.62 (KB) | 1.90 (KB/f) | 0.47 Mbps | 6 MB | 26 ms | 80% |
| 2 | Princess Bride | 167766 | 29.73 (KB) | 4.89 (KB/f) | 1.16 Mbps | 38 KB | 101 ms | 100% |
| 3 | CNN News | 164748 | 30.11 (KB) | 4.89 (KB/f) | 1.16 Mbps | 38 KB | 145 ms | 100% |
| 4 | Wizard of Oz | 41760 | 41.89 (KB) | 5.09 (KB/f) | 1.5 Mbps | 6 MB | 45 ms | 80% |
| 5 | Advertisements | 16316 | 10.08 (KB) | 1.86 (KB/f) | 0.59 Mbps | 420 KB | 513 ms | 75% |
| 6 | Star War | 174136 | 22.62 (KB) | 1.90 (KB/f) | 0.40 Mbps | 11 MB | 5 sec | 90% |

TABLE 1-continued

| Expermt. No. | Title of Program | No. of Frames | Max. Frame Size | Avg. Frame Size | Transm. rate r | Memo. Size | Working-ahead | Network Utilization |
|---|---|---|---|---|---|---|---|---|
| 7 | Advertisements | 16316 | 10.08 (KB) | 1.86 (KB/f) | 0.59 Mbps | 316 KB | 100 ms | 70% |
| 8 | Star Wars (CRTT) | 174136 | 22.62 (KB) | 1.90 (KB/f) | 0.36 Mbps | 23 MB | 37 sec | 100% |
| 9 | Advertisements (D-BIND) | 16316 | 10.08 (KB) | 1.86 (KB/f) | 1.5 Mbps | 1159 KB | 130 ms | 26% |

What is claimed is:

1. A method for transmitting variable-bit-rate information through constant-bit-rate channels to a recipient comprising a memory and a playback device, comprising the steps of:

obtaining an information stream $v$, $v=\{f_0, f_1, f_2, \ldots, f_{n-1}\}$ wherein $f_i$ denotes an with information frame of said information stream, and wherein said information frames are numbered from 0 to n−1, i.e., $0 \leq i < n$, for a peak transmission rate r of said channel and a buffer size b of the recipient;

calculating the cumulative frame size $F_i$ of said information stream $v$, $F_i = F_{i-1} + f_i$, wherein $0 \leq i < n$ and $F_{-1} = 0$;

determining a lazy transmission schedule $L_i$ for said information stream $v$, $L_i = \{r; t_0, t_1, t_2, \ldots, t_{2p+1}\}$ wherein $0 \leq p < n$, times $t_0, t_2, t_4, \ldots t_{2p}$ represent starting points of transmission of respective frames $f_0$ to $f_{n-1}$, and times $t_1, t_3, t_5, \ldots t_{2p+1}$ represent end points of transmission of said respective frames $f_0$ to $f_{n-1}$, such that none of said information frames is transmitted to said recipient before said information frames are required for play back;

determining a revised transmission schedule $\gamma_A$ for the reorganized information stream $v$, $\gamma_A = \{r; t_0, t_1, t_2, \ldots, t_{2q+1}\}$ wherein $0 \leq p < n$, times $t_0, t_2, t_4, \ldots t_{2q}$ represent starting points of transmission of said respective frames $f_0$ to $f_{n-1}$ according to said revised transmission schedule, and times $t_1, t_3, t_5, \ldots t_{2q+1}$ represent end points of transmission of said respective frames $f_0$ to $f_{n-1}$ according to said revised transmission schedule, such that the information stream is transmitted as long as a vacancy in the buffer memory of said recipient is available to receive said information stream, said revised transmission schedule thereby constituting an aggressive transmission schedule; and transmitting said information data according to said aggressive transmission schedule when said buffer is available to receive said information stream, and transmitting said information frame according to said lazy transmission schedule, in which information frames are transmitted only when required for play back, when said buffer is not available to receive said information stream.

2. The method according to claim 1 wherein $L_i = \max\{F_i, L_{i-1} - r \times T_f\}$, for $0 \leq i \leq n-2$, and $L_{n-1} = |v|$ wherein $T_f$ denotes the interval between two successive frames.

3. The method according to claim 1 wherein $A_i = \min\{|v|, F_i + \hat{b}_v(r), A_{i-1} + r \times T_f\}$, for $1 \leq i \leq n-1$, and $A_0 = L_0$ wherein $T_f$ denotes the interval between two successive frames.

* * * * *